United States Patent
Graf et al.

(10) Patent No.: US 11,916,647 B2
(45) Date of Patent: Feb. 27, 2024

(54) SYSTEMS AND METHODS FOR LINE-OF-SIGHT AND BEYOND-LINE-OF-SIGHT COMMUNICATIONS USING A SINGLE APERTURE

(71) Applicant: Rockwell Collins, Inc., Cedar Rapids, IA (US)

(72) Inventors: Joseph T. Graf, Center Point, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 50 days.

(21) Appl. No.: 17/325,486

(22) Filed: May 20, 2021

(65) Prior Publication Data
US 2022/0376775 A1 Nov. 24, 2022

(51) Int. Cl.
*H04B 7/185* (2006.01)
*H04B 7/212* (2006.01)
*H04B 7/195* (2006.01)

(52) U.S. Cl.
CPC ..... *H04B 7/18508* (2013.01); *H04B 7/18517* (2013.01); *H04B 7/195* (2013.01); *H04B 7/212* (2013.01)

(58) Field of Classification Search
CPC ............ H04B 7/18517; H04B 7/18508; H04B 7/195; H04B 7/212
See application file for complete search history.

(56) References Cited

U.S. PATENT DOCUMENTS

| | | |
|---|---|---|
| 7,068,998 B2 | 6/2006 | Zavidniak |
| 7,839,344 B2 | 11/2010 | Marrocco et al. |
| 7,873,165 B2 | 1/2011 | Richards et al. |
| 7,969,368 B2 | 6/2011 | Marrocco et al. |
| 9,761,937 B2 | 9/2017 | Runyon et al. |

(Continued)

FOREIGN PATENT DOCUMENTS

| | | | | |
|---|---|---|---|---|
| CN | 105960760 A | * | 9/2016 | ............. H04B 1/006 |
| WO | WO-0133666 A1 | * | 5/2001 | ........... H01Q 1/3275 |
| WO | 2020002937 A1 | | 1/2020 | |

OTHER PUBLICATIONS

CAES, Product Brief, "Model SAT1743-S Multi-Function Tactical Wideband Interoperable Antenna System", URL: https://cobhamaes.com/sites/default/files/documents/productbrief-SAT1743.pdf, downloaded Mar. 4, 2021, 2 pages.

*Primary Examiner* — Keith Ferguson
(74) *Attorney, Agent, or Firm* — Suiter Swantz pc llo (57) ABSTRACT

A communications system for line-of-sight (LOS) and beyond-line-of-sight (BLOS) communications using a single aperture includes one or more operators positioned within an environment, wherein each operator includes a common aperture, one or more low-earth orbit satellites communicatively coupled to a plurality of communications sub-systems disposed on the operators. In one embodiment, the communications sub-systems may include a first antenna element to transmit and receive first radio frequency signals along a first directional link via the common aperture. In another embodiment, the communications sub-systems may include a second antenna element to transmit and receive second radio frequency signals along a second directional link via the common aperture.

9 Claims, 5 Drawing Sheets

(56) References Cited

U.S. PATENT DOCUMENTS

| | | | | |
|---|---|---|---|---|
| 2008/0144815 | A1* | 6/2008 | Richards | H04K 1/00 380/34 |
| 2015/0011159 | A1* | 1/2015 | Marinov | H01Q 3/08 455/12.1 |
| 2015/0340762 | A1* | 11/2015 | Yakubovitch | H04B 7/18517 342/374 |
| 2017/0069972 | A1* | 3/2017 | Miller | H01Q 13/06 |
| 2018/0375572 | A1* | 12/2018 | Garcia | H04B 7/18584 |
| 2019/0305418 | A1* | 10/2019 | Buer | H01Q 3/40 |
| 2021/0013952 | A1 | 1/2021 | Tumula et al. | |
| 2021/0258834 | A1* | 8/2021 | Pastuszak | H04W 4/42 |
| 2022/0256366 | A1* | 8/2022 | Thommana | H04W 24/04 |

* cited by examiner

SYSTEMS AND METHODS FOR LINE-OF-SIGHT AND BEYOND-LINE-OF-SIGHT COMMUNICATIONS USING A SINGLE APERTURE

BACKGROUND

In many circumstances, including in many facets of military, commercial, and civil aviation, constant and consistent wireless communications critical for safety, mission success, and the like. Wireless communications systems often rely on line-of-sight (LOS) linkages involving or requiring the use of narrowly focused radio frequency signals generated by highly directional transmission systems. However, LOS linkages are often interrupted by one or more natural obstacles (e.g., terrain, distance, or the like) or one or more artificial obstacles (e.g., signal (RF) jamming, contested RF spectra, or the like). In such a situation, contingency plans for backup wireless communications often employ beyond-line-of-sight (BLOS) linkages involving propagation of radio frequency signals in the form of multiple, discrete waveforms. The propagation of radio frequency signals in this way often requires that communications platforms (e.g., military, commercial, and/or civilian aircraft) have multiple antenna systems configured to transmit and receive a variety of different waveforms. In the case of aircraft, the inclusion of multiple antennas may increase the operating weight and/or size of the aircraft, which may result in increased operational cost, and requires a separate aperture for each antenna, which can increase parasitic drag on the aircraft. Consequently, there is a need for solutions that provide LOS and BLOS communications without significantly increasing size, weight, power demands, or parasitic drag with respect to the aircraft.

SUMMARY

A communications system is disclosed, in accordance with one or more embodiments of the present disclosure. In one embodiment, the communications system includes one or more operators positioned in an environment, wherein each of the one or more operators includes a common aperture. In another embodiment, the communications system includes one or more low-earth orbit satellites. In another embodiment, the communications system includes a plurality of communications sub-systems disposed on the one or more operators, wherein each of the plurality of communications sub-systems is configured to operate in an operating mode, and wherein each of the plurality of communications sub-systems comprises at least: a first antenna element configured to transmit to and receive from at least one of the plurality of communications sub-systems one or more first radio frequency signals along a first directional link via the common aperture; a second antenna element configured to transmit to and receive from the one or more low-earth orbit satellites one or more second radio frequency signals along a second directional link via the common aperture; and one or more controllers having one or more processors, wherein the one or more processors are configured to execute a set of written program instructions stored in one or more memory units, wherein the set of written program instructions is configured to cause the controller to provide one or more control signals to at least one of the one or more low-earth orbit satellites or the plurality of communications sub-systems.

A communications sub-system is disclosed, in accordance with one or more embodiments of the present disclosure. In one embodiment, the communications sub-system includes: a first antenna element configured to transmit and receive, in a first operating mode, one or more first radio frequency signals along a first directional link via a common aperture; a second antenna element configured to transmit and receive, in a second operating mode, one or more second radio frequency signals along a second directional link via the common aperture; and one or more controllers having one or more processors, wherein the one or more processors are configured to execute a set of written program instructions stored in one or more memory units, wherein the set of written program instructions is configured to cause the controller to provide one or more control signals to at least one of the first antenna element or the second antenna element.

BRIEF DESCRIPTION OF THE DRAWINGS

The numerous advantages of the embodiments of the inventive concepts disclosed herein may be better understood by those skilled in the art by reference to the accompanying figures.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disposed herein are directed to systems and methods for line-of-sight and beyond-line-of-sight communications using a single aperture, in accordance with one or more embodiments of the present disclosure.

Figure 1A:
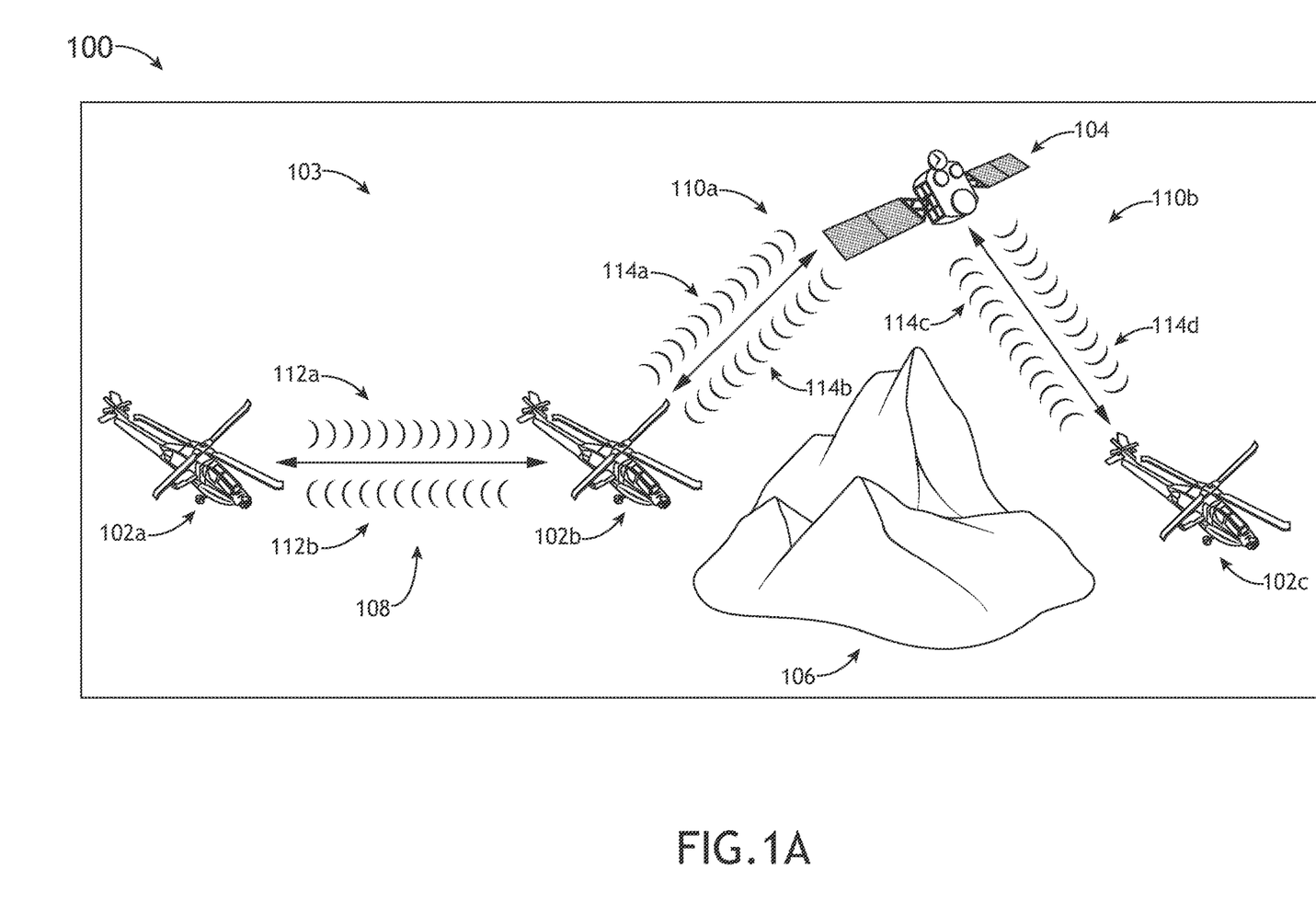
FIG. 1A is a conceptual illustration of an exemplary embodiment of a system for line-of-sight and beyond-line-of-sight communications using a single aperture, in accordance with one or more embodiments of the present disclosure.

Referring to FIG. 1A, a conceptual illustration of an exemplary embodiment of a system 100 for line-of-sight and beyond-line-of-sight communications using a single aperture is shown, in accordance with one or more embodiments of the present disclosure.

Figure 1B:
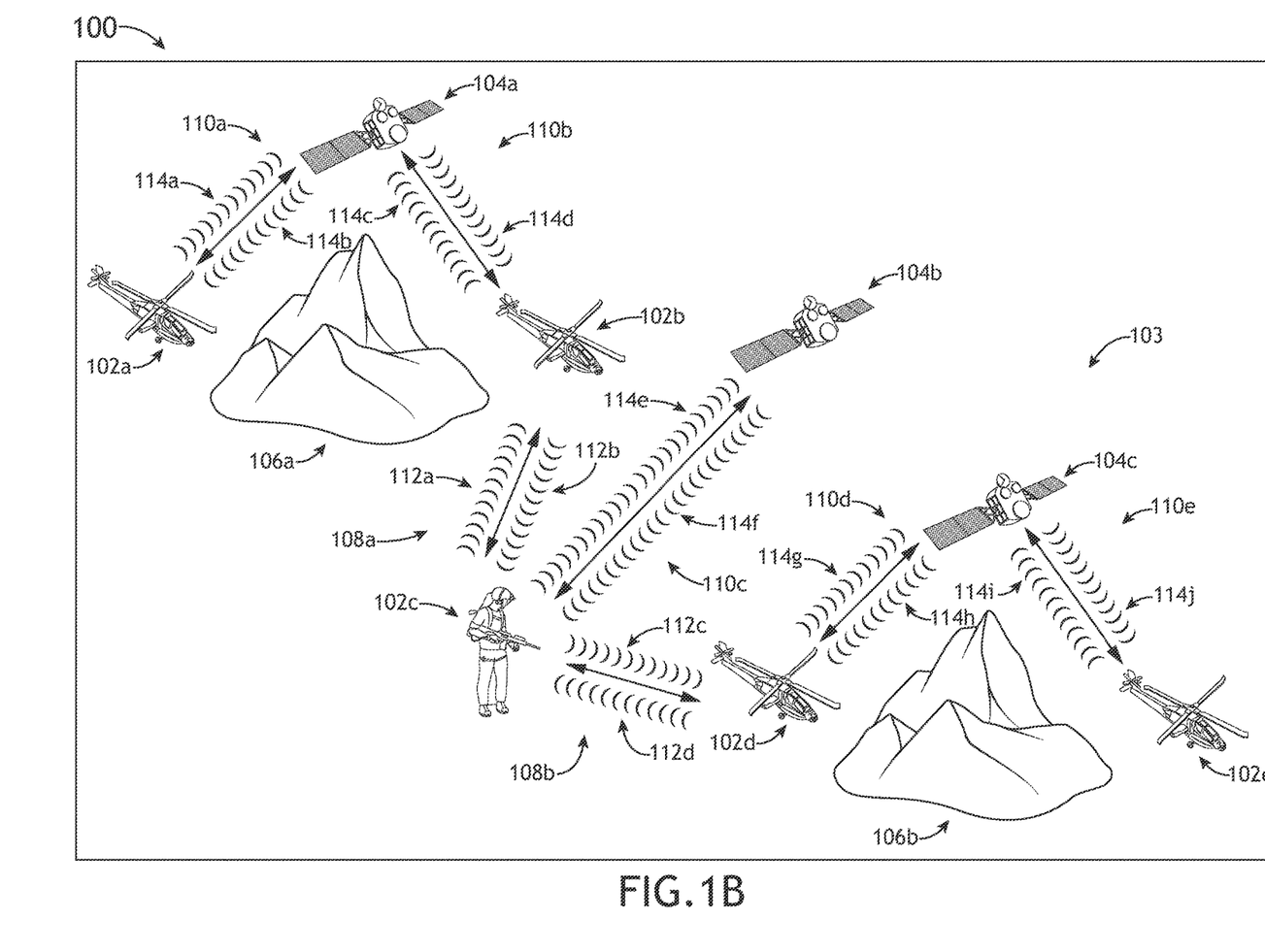
FIG. 1B is a conceptual illustration of an exemplary embodiment of a system for line-of-sight and beyond-line-of-sight communications using a single aperture, in accordance with one or more embodiments of the present disclosure.

The system 100 may include one or more operators 102 positioned within an environment 103. For example, the system 100 may include one or more operators 102a, 102b, and/or 102c positioned within the environment 103. The environment 103 may include, but is not limited to, a warzone, a battlefield, an area of military engagement, airspace, ocean, open water, or the like. The environment 103 may include one or more obstacles 106 (e.g., as shown in FIG. 1B, obstacle 106a and obstacle 106b) that may result in one or more undesirable effects on wireless communication ability (e.g., blocking or impedance of radio frequency signals in LOS communication modes).

The one or more operators 102 may include, but are not limited to, aerial vehicles (e.g., military, commercial, and/or civilian aircraft), unmanned aerial vehicles (e.g., drones), ground-based vehicles (e.g., automobiles, trucks, tanks, armored vehicles, or the like), ground-based stations (e.g., military bases, airports, outposts, buildings, encampments, or the like), or ground-based persons (e.g., soldiers, military personnel, civilians, commercial aircraft crew and/or personnel, or the like).

The one or more operators 102 may include a common aperture coupled to, formed as a portion of, or otherwise located on one or more portions of the one or more operators 102. For example, in the case of an operator 102 comprising an aerial vehicle (whether manned or unmanned), the common aperture may comprise an aperture within the body (e.g., fuselage, wings, skin, or the like) of the aerial vehicle. By way of another example, in the case of an operator 102 comprising a ground-based vehicle, the common aperture may comprise an aperture within the body of the ground-based vehicle. As yet another example, in the case of an operator 102 comprising a ground-based person, the common aperture may comprise an aperture communicatively coupled to one or more elements of the system 100, wherein at least one of such one or more elements of the system 100 is carried by the ground-based person or otherwise mounted on, coupled to, or affixed to one or more portions of the ground-based person. It is specifically contemplated, for purposes of the present disclosure, and described in greater detail herein, that the common aperture may comprise a component of one or more other elements of the system 100 (e.g., a first antenna element and a second antenna element, each of which is described herein).

The system 100 may include a plurality of communications sub-systems 101 disposed on the one or more operators 102. For example, each of the plurality of communications sub-systems 101 may be coupled to, formed as a portion of, or otherwise located on one or more portions of the one or more operators 102. For example, in the case of an operator 102 comprising an aerial vehicle (whether manned or unmanned), each of the plurality of communications sub-systems 101 may comprise an element of the body (e.g., such as through coupling or mounting to one or more portions of the fuselage, wings, skin, or the like) of the aerial vehicle. By way of another example, in the case of an operator 102 comprising a ground-based vehicle, each of the plurality of communications sub-systems 101 may comprise an element of the body of the ground-based vehicle (e.g., such as through coupling or mounting to one or more portions of the vehicle). As yet another example, in the case of an operator 102 comprising a ground-based person, each of the plurality of communications sub-systems 101 may be carried by the ground-based person or otherwise mounted on, coupled to, or affixed to one or more portions of the ground-based person, including, without limitation, one or more portions of one or more pieces of equipment, gear, or the like, of the ground-based person. It is specifically contemplated, for purposes of the present disclosure, and described in greater detail herein, each of the plurality of communications sub-systems 101 may include the common aperture. Additionally, it is noted that, for the purposes of clarity and simplicity in the present disclosure, the term "operator 102" may be interpreted as referring to the communications sub-system 101 disposed on any such operator 102.

Each of the plurality of communications sub-systems 101 may include a first antenna element 116. The first antenna element 116 may be configured to transmit to and to receive one or more first radio frequency signals 112 (e.g., first radio frequency waves) along a first directional link 108. For example, the first antenna element 116 may be configured to transmit to and receive, from one or more of the plurality of communications sub-systems 101, the one or more first radio frequency signals 112. In this sense, the plurality of communications sub-systems 101, via the first antenna element 116, may be configured to operate as LOS repeaters and/or relay links for the transmission of one or more first radio frequency signals 112 between two or more of the plurality of communications sub-systems 101. By way of another example, the first antenna element 116 may be configured to transmit to and receive, from another first antenna element 116 of one or more of the plurality of communications sub-systems 101, the one or more first radio frequency signals 112. In this sense, the first antenna element 116 of each of the plurality of communications sub-systems 101 may be communicatively coupled to one or more other first antenna elements 116 of the plurality of communications sub-systems 101. The first antenna element 116 may be configured to transmit and receive the one or more first radio frequency signals 116 via the common aperture 210 (e.g., the one or more first radio frequency signals 116 may be transmitted through the common aperture 210 in one or more directions).

The one or more first radio frequency signals 116 may include any radio frequency wave known in the art to be suitable for line-of-sight (LOS) communications. For example, the one or more first radio frequency signals 116 may include one or more electromagnetic radio waves having a frequency of between approximately 40 gigahertz (GHz) and approximately 75 gigahertz (GHz). By way of another example, the one or more first radio frequency signals 116 may include one or more electromagnetic radio waves within the Institute of Electrical and Electronics Engineers (IEEE) standard designated V-band. The one or more first radio frequency signals 116 may be configured to transfer data between one or more components of the system 100 in analog and/or digital form.

The first directional link 108 may include any line-of-sight (LOS) communication link. For example, the first directional link 108 may include any LOS link between two or more operators 102. By way of another example, as shown in FIG. 1A, the first directional link 108 may comprise a LOS link between a first operator (e.g., operator 102*a*) and a second operator (e.g., operator 102*b*). In this sense, operator 102*a* may be configured to transmit (e.g., via the first antenna element 116) one or more first radio frequency signals 112*a* to operator 102*b* along the first directional link 108, and operator 102*b* may be configured to receive (e.g., via the first antenna element 116) the one or more first radio frequency signals 112*a* from the operator 102*a* along the first directional link 108. In another embodiment, the operator 102*b* may be configured to transmit (e.g., via the first antenna element 116) one or more first radio frequency signals 112*b* to operator 102*a* along the first directional link 108, and operator 102*a* may be configured to receive (e.g., via the first antenna element 116) the one or more first radio frequency signals 112*b* from the operator 102*b* along the first directional link 108.

Each of the plurality of communications sub-systems 101 may include a second antenna element 118. The second antenna element 118 may be configured to transmit to and to receive one or more second radio frequency signals 114 (e.g., second radio frequency waves) along a second directional link 110. For example, the second antenna element 118 may be configured to transmit to and receive from one or more of the plurality of communications sub-systems 101 the one or more second radio frequency signals 114. In this sense, the plurality of communications sub-systems 101, via the second antenna element 118, may be configured to operate as BLOS repeaters and/or relay links for the transmission of one or more second radio frequency signals 114 between two or more of the plurality of communications sub-systems 101. By way of another example, the second antenna element 118 may be configured to transmit the one or more second radio frequency signals 114 to and receive the one or more second radio frequency signals 114 from another second antenna element 118 of one or more of the plurality of communications sub-systems 101. In this sense, the second antenna element 118 of each of the plurality of communications sub-systems 101 may be communicatively coupled to one or more other second antenna elements 118 of the plurality of communications sub-systems 101. The second antenna element 118 may be configured to transmit and receive the one or more second radio frequency signals 118 via the common aperture 210 (e.g., the one or more second radio frequency signals 118 may be transmitted through the common aperture 210 in one or more directions).

In some embodiments, the second antenna element 118 may be configured to transmit to and receive from one or more low-earth satellites 104 the one or more second radio frequency signals 114. For example, as shown in FIG. 1A, the operator 102*b* may be configured to transmit (e.g., via the second antenna element 118) one or more second radio frequency signals 114*a* to a low-earth orbit satellite 104 along the second directional link 110*a*, and the low-earth orbit satellite 104 may be configured to receive (e.g., via satellite communication circuitry 202 described in greater detail herein) the one or more second radio frequency signals 114*a* from the operator 102*b* along the second directional link 110*a*. In another embodiment, the low-earth orbit satellite 104 may be configured to transmit (e.g., via satellite communication circuitry 202) one or more second radio frequency signals 114*b* to the operator 102*b* along the second directional link 110*a*, and the operator 102*b* may be configured to receive (e.g., via the second antenna element 118) the one or more second radio frequency signals 114*b* from the low-earth orbit satellite 104 along the second directional link 110*a*.

In another embodiment, the low-earth orbit satellite 104 may be configured to transmit (e.g., via satellite communication circuitry 202) one or more second radio frequency signals 114*d* to operator 102*c* along the second directional link 110*b*, and the operator 102*c* may be configured to receive (e.g., via the second antenna element 118) the one or more second radio frequency signals 114*d* from the low-earth orbit satellite 104 along the second directional link 110*b*. By way of another example, the operator 102*c* may be configured to transmit (e.g., via the second antenna element 118) one or more second radio frequency signals 114*c* to the low-earth orbit satellite 104 along the second directional link 110*b*, and the low-earth orbit satellite 104 may be configured to receive (e.g., via satellite communication circuitry 202) the one or more second radio frequency signals 114*c* from the operator 102*c* along the second directional link 110*b*.

The one or more second radio frequency signals 118 may include any radio frequency wave known in the art to be suitable for beyond-line-of-sight (BLOS) communications. For example, the one or more second radio frequency signals 118 may include one or more electromagnetic radio waves having a frequency of between approximately 26 gigahertz (GHz) and approximately 40 gigahertz (GHz). By way of another example, the one or more second radio frequency signals 118 may include one or more electromagnetic radio waves within the Ka band. The one or more second radio frequency signals 118 may be configured to transfer data between one or more components of the system 100 in analog and/or digital form.

The second directional link 110 may include any beyond-line-of-sight (BLOS) communication link. For example, the second directional link 110 may include any BLOS link between two or more operators 102. By way of another example, as shown in FIG. 1A, the second directional link 110 may comprise a BLOS link between a first operator (e.g., operator 102*b*) and a second operator (e.g., operator 102*c*). In this sense, operator 102*b* may be configured to transmit (e.g., via the second antenna element 118) one or more second radio frequency signals 114*a* to the low-earth orbit satellite 104 along the second directional link 110*a*, and the low-earth orbit satellite 104 may be configured to receive (e.g., via satellite communication circuitry 202) the one or more second radio frequency signals 114*a* from the operator 102*b*. Upon receipt of the one or more second radio frequency signals 114*a* from the operator 102*b*, the low-earth orbit satellite 104 may be configured to transmit (e.g., via satellite communication circuitry 202) one or more additional second radio frequency signals 114*d* to the operator 102*c* along an additional second directional link 110*b*, and operator 102*c* may be configured to receive (e.g., via the second antenna element 118) the one or more second radio frequency signals 114*d* from the low-earth orbit satellite 104 along the second directional link 110*b*. In this sense, the one or more low-earth orbit satellites 104 may be configured to facilitate BLOS communication between at least two of the one or more operators 102 (e.g., operator 102*b* and operator 102*c*). It is specifically noted that, for purposes of the present disclosure, reference to the "second directional link 110" is specifically intended, in one or more embodiments, to include a plurality of communications links (e.g., second directional link 110*a* and second directional link 110*b* may be referred to, individually and collectively, as the "second directional link 110" throughout the present disclosure).

In some embodiments, the plurality of communications sub-systems 101 disposed on the one or more operators 102 (e.g., via the first antenna element 116 and the second antenna element 118 of each of the plurality of communications sub-systems 101) may be configured to function as one or more data repeaters and/or relay nodes for the transmission of one or more radio frequency signals (e.g., the one or more first radio frequency signals 112 and/or the one or more second radio frequency signals 114).

In this sense, the plurality of communications sub-systems 101 may be configured to operate as one or more nodes for transmission of one or more first radio frequency signals 112 between two or more operators 102. For example, as shown in FIG. 1B, operator 102*c* may be configured to act as a node for the transmission of one or more first radio frequency signals 112 between two or more operators 102 (e.g., operator 102*b* and operator 102*d*). As such, operator 102*b* may be configured to transmit (e.g., via the first antenna element 116) one or more first radio frequency signals 112*a* to operator 102*c* along the first directional link 108*a*, and operator 102*c* may be configured to receive (e.g., via the first antenna element 116) the one or more first radio frequency signals 112*a* from the operator 102*b* along the first directional link 108*a*. Upon receipt of the one or more first radio frequency signals 112*a* from the operator 102*b*, the operator 102*c* may be configured to transmit (e.g., via the first antenna element 116) one or more additional first radio frequency signals 112*c* to the operator 102*d* along an additional first directional link 108*b*, and the operator 102*d* may be configured to receive (e.g., via the first antenna element 116) the one or more additional first radio frequency signals 112*c* from the operator 102*c* along the additional first directional link 108*b*. It is specifically noted that, for purposes of the present disclosure, reference to the "first directional link 108" is specifically intended, in one or more embodiments, to include a plurality of communications links (e.g., first directional link 108*a* and first directional link 108*b* may be referred to, individually and collectively, as the "first directional link 108" throughout the present disclosure).

In another embodiment, the plurality of communications sub-systems 101 may be configured to operate as one or more nodes for transmission of one or more second radio frequency signals 114 between two or more operators 102. For example, as shown in FIG. 1B, operator 102*b* and operator 102*c* may each be configured to act as nodes for the transmission of one or more second radio frequency signals 114 between two or more low-earth orbit satellites 104 (e.g., low-earth orbit satellite 104*a* and low-earth orbit satellite 104*b*). As such, low-earth orbit satellite 104*a* may be configured to transmit (e.g., via satellite communication circuitry 202) one or more second radio frequency signals 114*d* to operator 102*b* along the second directional link 110*b*, and operator 102*b* may be configured to receive (e.g., via the second antenna element 118) the one or more second radio frequency signals 114*d* from the low-earth satellite 104*a* along the second directional link 110*b*. Upon receipt of the one or more second radio frequency signals 114*d*, the operator 102*b* may be configured to transmit (e.g., via the first antenna element 116) one or more first radio frequency signals 112*b* to the operator 102*c* along the first directional link 108*a*. Prior to transmission of the one or more first radio frequency signals 112*b* to the operator 102*c*, the operator 102*b* may perform one or more conversion functions configured to extract data transmitted from the low-earth satellite orbit 104*a* to the operator 102*b* via the one or more second radio frequency signals 114*d* along the second directional link 110*b*, and allow such data to be transmitted to the operator 102*c* via the one or more first radio frequency signals 112*b* along the first directional link 108*a*. Upon receipt of the one or more first radio frequency signals 112*a* from the operator 102*b*, the operator 102*c* may be configured to transmit (e.g., via the second antenna element 118) one or more additional second radio frequency signals 114*e* to low-earth orbit satellite 104*b* along an additional second directional link 110*c*.

It is noted that, though not described in exemplary illustrations, several embodiments of the inventive concepts of the present application are illustrated in FIG. 1A and FIG. 1B, and are intended to be the subject matter of the present application. For example, for purposes of the foregoing exemplary illustrations, each of the various components of the system 100 as illustrated in FIGS. 1A-1B may be configured to function with one or more other various components of the system 100 in a manner consistent and/or equivalent to the manner of operation of the illustrative embodiments described in detail herein.

With reference to the one or more operators 102, the various embodiments of the one or more operators 102, as shown in FIGS. 1A-1B (e.g., operator 102*a*, operator 102*b*, operator 102*c*, operator 102*d*, and operator 102*e*), should be interpreted as having all of the functions, features, and/or qualities of the herein described one or more operators 102. With reference to the one or more low-earth orbit satellites 104, the various embodiments of the one or more low-earth orbit satellites 104, as shown in FIGS. 1A-1B (e.g., low-earth orbit satellite 104*a*, low-earth orbit satellite 104*b*, and low-earth orbit satellite 104*c*), should be interpreted as having all of the functions, features, and/or qualities of the herein described one or more low-earth orbit satellites 104.

With reference to the one or more first radio frequency signals 112, the various embodiments of the one or more first radio frequency signals 112, as shown in FIGS. 1A-1B (e.g., first radio frequency signals 112a, first radio frequency signals 112b, first radio frequency signals 112c, and first radio frequency signals 112d), should be interpreted as having all of the functions, features, and/or qualities of the herein described one or more first radio frequency signals 112.

With reference to the one or more second radio frequency signals 114, the various embodiments of the one or more second radio frequency signals 114, as shown in FIGS. 1A-1B (e.g., second radio frequency signals 114a, second radio frequency signals 114b, second radio frequency signals 114c, second radio frequency signals 114d, second radio frequency signals 114e, second radio frequency signals 114f, second radio frequency signals 114g, second radio frequency signals 114h, second radio frequency signals 114i, and second radio frequency signals 114j), should be interpreted as having all of the functions, features, and/or qualities of the herein described one or more second radio frequency signals 114.

With reference to the first directional link 108, the various embodiments of the first directional link 108, as shown in FIGS. 1A-1B (e.g., first directional link 108a and first directional link 108b), should be interpreted as having all of the functions, features, and/or qualities of the herein described first directional link 108.

With reference to the second directional link 110, the various embodiments of the second directional link 110, as shown in FIGS. 1A-1B (e.g., second directional link 110a, second directional link 110b, second directional link 110c, second directional link 110d, and second directional link 110e), should be interpreted as having all of the functions, features, and/or qualities of the herein described second directional link 110.

The common aperture (shown as element 210 in at least FIG. 2B) may be configured to permit the transmission of one or more radio frequency signals (e.g., the one or more first radio frequency signals 112 and/or the one or more second radio frequency signals 114) to and/or from the plurality of communications sub-systems 101. For example, the common aperture may be communicatively and/or mechanically coupled to the plurality of communications sub-systems, and may include any antenna aperture known in the art to be suitable for the purposes contemplated by the present disclosure, including, without limitation, pyramidal apertures, conical apertures, rectangular apertures, waveguides, parabolic reflectors, screens, phased arrays, omnidirectional apertures, monopole-based apertures, dipole-based apertures, helical apertures, or the like.

The plurality of communications sub-systems 101 may be configured to operate in one or more operating modes with respect to the transmission and receipt of one or more radio frequency signals (e.g., the one or more first radio frequency signals 112 and/or the one or more second radio frequency signals 114). For example, the plurality of communications sub-systems 101 may be configured to operate in a time-phased mode in that the plurality of communications sub-systems 101 may be configured to transmit and/or receive signals (e.g., the one or more first radio frequency signals 112 and/or the one or more second radio frequency signals 114) in a phased manner. In another illustrative example, the plurality of communications sub-systems 101 may be configured to operate in a nearly-simultaneous time-division access (TDMA) mode in that the plurality of communications sub-systems 101 may be configured to transmit and/or receive signals (e.g., the one or more first radio frequency signals 112 and the one or more second radio frequency signals 114) in based on a time-divided schedule. In another illustrative example, the plurality of communications sub-systems 101 may be configured to operate in a simultaneous mode in that the plurality of communications sub-systems 101 may be configured to transmit and/or receive signals (e.g., the one or more first radio frequency signals 112 and the one or more second radio frequency signals 114) simultaneously.

Figure 2A:
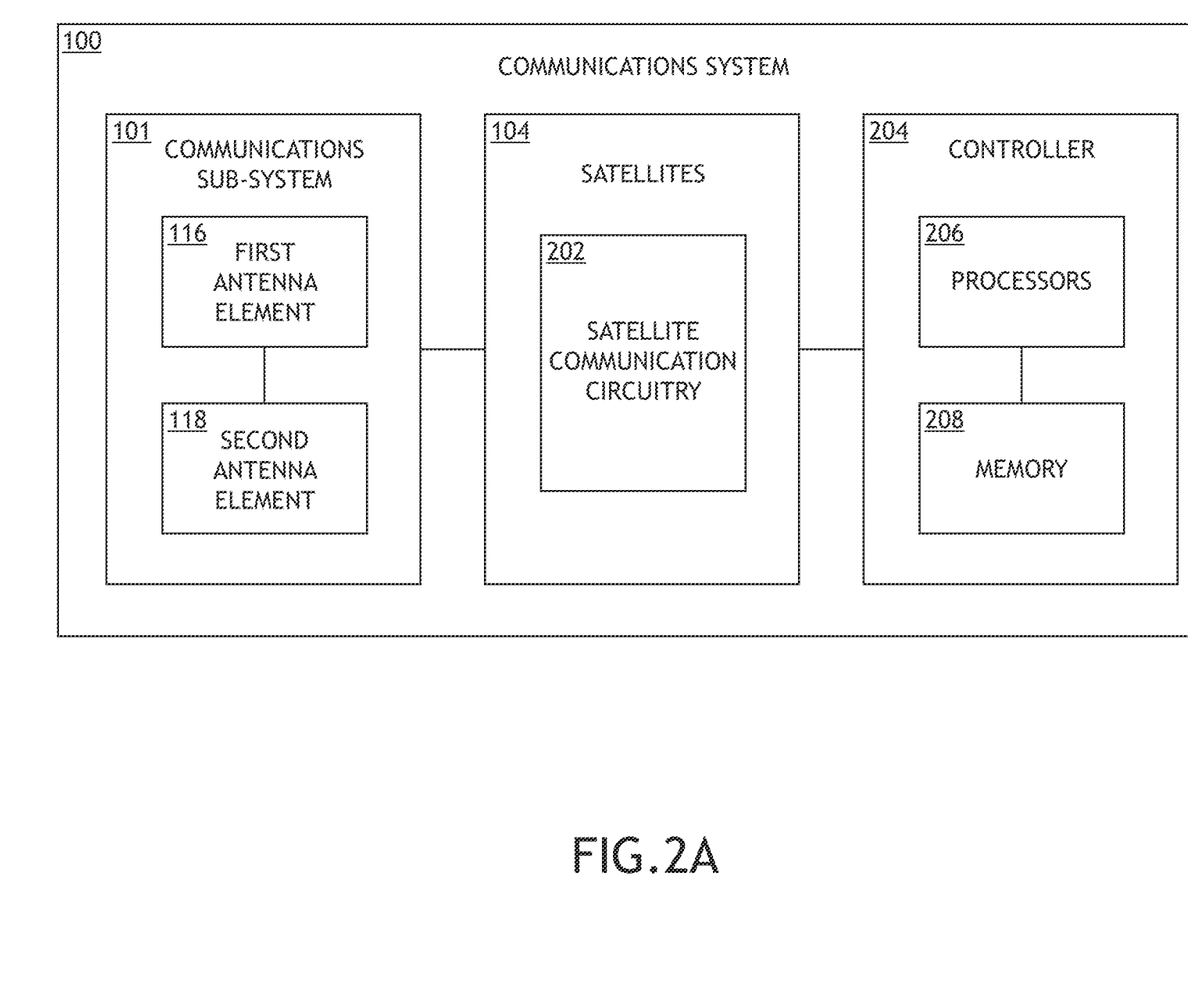
FIG. 2A is a block diagram illustration of an exemplary embodiment of a communications system, in accordance with one or more embodiments of the present disclosure.

FIG. 2A illustrates a conceptual block diagram of an exemplary embodiment of a communications system 100, in accordance with one or more embodiments of the present disclosure. The system 100 may include a plurality of communications sub-systems 101, wherein each of the plurality of communications sub-systems includes a first antenna element 116 communicatively coupled to a second antenna element 118.

The system 100 may include one or more low-earth orbit satellites 104 communicatively coupled to one or more other components of the system 100 (e.g., the plurality of communications sub-systems 101 and/or the controller 204). For example, the one or more low-earth orbit satellites 104 may be communicatively coupled to the plurality of communications sub-systems 101 via satellite communication circuitry 202. The satellite communication circuitry 202 may include any communication circuitry now in the art to be suitable for the purposes contemplated by the present disclosure, including, without limitation, any communication circuitry configured to transmit and/or receive one or more second radio frequency signals 114 along the second directional link 110.

The system 100 may include one or more controllers 204 having one or more processors 206. The one or more processors 206 may include any one or more processing elements known in the art. In this regard, the one or more processors 206 may include any microprocessor-type device configured to execute software algorithms and/or instructions (e.g., written code). In one embodiment, the one or more processors 206 may consist of a desktop computer, mainframe computer system, workstation, image computer, parallel processor, or other computer system (e.g., networked computer) configured to execute a program configured to operate the system 100, as described throughout the present disclosure.

The system 100 may include one or more memory units 208. The one or more memory units 208 may include any storage medium known in the art suitable for storing program instructions executable by the associated one or more processors 208.

The one or more processors 208 of the one or more controllers 204 may be configured to execute one or more sets of program instructions stored in the one or more memory units 208. For example, the one or more sets of program instructions may be configured to cause the controllers 204 (e.g., via the processors 206) to carry out all or some of the steps and processes of the present disclosure.

In one embodiment, the one or more processors 206 may be configured to cause the one or more controllers 204 to provide one or more control signals to one or more components of the system 100. For example, the one or more processors 206 may be configured to provide one or more control signals to the plurality of communications sub-systems 101 (e.g., the first antenna element 116 and/or the second antenna element 118) or the one or more low-earth orbit satellites 104. In this sense, the one or more processors 206 may be configured to provide one or more control signals to the plurality of communications sub-systems 101 (e.g., the first antenna element 116 and/or the second antenna element 118) or the one or more low-earth orbit satellites 104 such that the plurality of communications sub-systems 101 (e.g., via the first antenna element 116 and/or the second antenna element 118) and the one or more low-earth orbit satellites 104 (e.g., via the satellite communication circuitry 202) transmit and/or receive one or more radio frequency signals (e.g., the one or more first radio frequency signals 112 and/or the one or more second radio frequency signals 114).

The one or more memory units 208 may include any memory unit known in the art to be suitable for the purposes contemplated herein. For example, the one or more memory units 208 may include a non-transitory memory medium. For instance, the memory 208 may include, but is not limited to, a read-only memory, a random-access memory, a magnetic or optical memory device (e.g., disk), a magnetic tape, a solid-state drive and the like. The one or more memory units 110 may include remote memory (e.g., server or cloud-based memory), accessible through a network (e.g., internet, intranet and the like). In another embodiment, the memory 208 maintains program instructions for causing the one or more processors 208 to carry out the various steps described through the present disclosure.

Though not shown, the system 100 may include one or more user interfaces. The one or more user interfaces may include, but are not limited to, one or more desktops, tablets, smartphones, smart watches, or the like. The one or more user interfaces may include a display used to display data of the system 100 to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in embodiments of the present disclosure. In another embodiment, a user may input selections and/or instructions responsive to data displayed to the user via the user interface. In this regard, the user interface may be configured to receive input selections and/or instructions from a user through a configuration/calibration app, wherein the input selections may alter one or more characteristics of system 100. Input instructions may include, but are not limited to, calibration and sensitivity instructions for the one or more components of the system 100.

The one or more components of the system 100 (e.g., the plurality of communications sub-systems 101, the first antenna element 116, the second antenna element 116, the controller 204, the one or more operators 102, the one or more user interfaces) may be communicatively coupled to the various other components of present disclosure in any manner known in the art. For example, the components may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

It should be recognized that the steps described throughout the present disclosure may be carried out by a single computer system or, alternatively, multiple computer systems. In general, the term "processor" may be broadly defined to encompass any device having one or more processing elements, which execute program instructions from memory 208. Moreover, different subsystems of the system 100 (e.g., the plurality of communications sub-systems 101, the first antenna element 116, the second antenna element 116, the controller 204, the one or more operators 102, the one or more user interfaces) may include processor or logic elements suitable for carrying out at least a portion of the steps described throughout the present disclosure. Therefore, the above description should not be interpreted as a limitation on the present disclosure but merely an illustration.

Figure 2B:
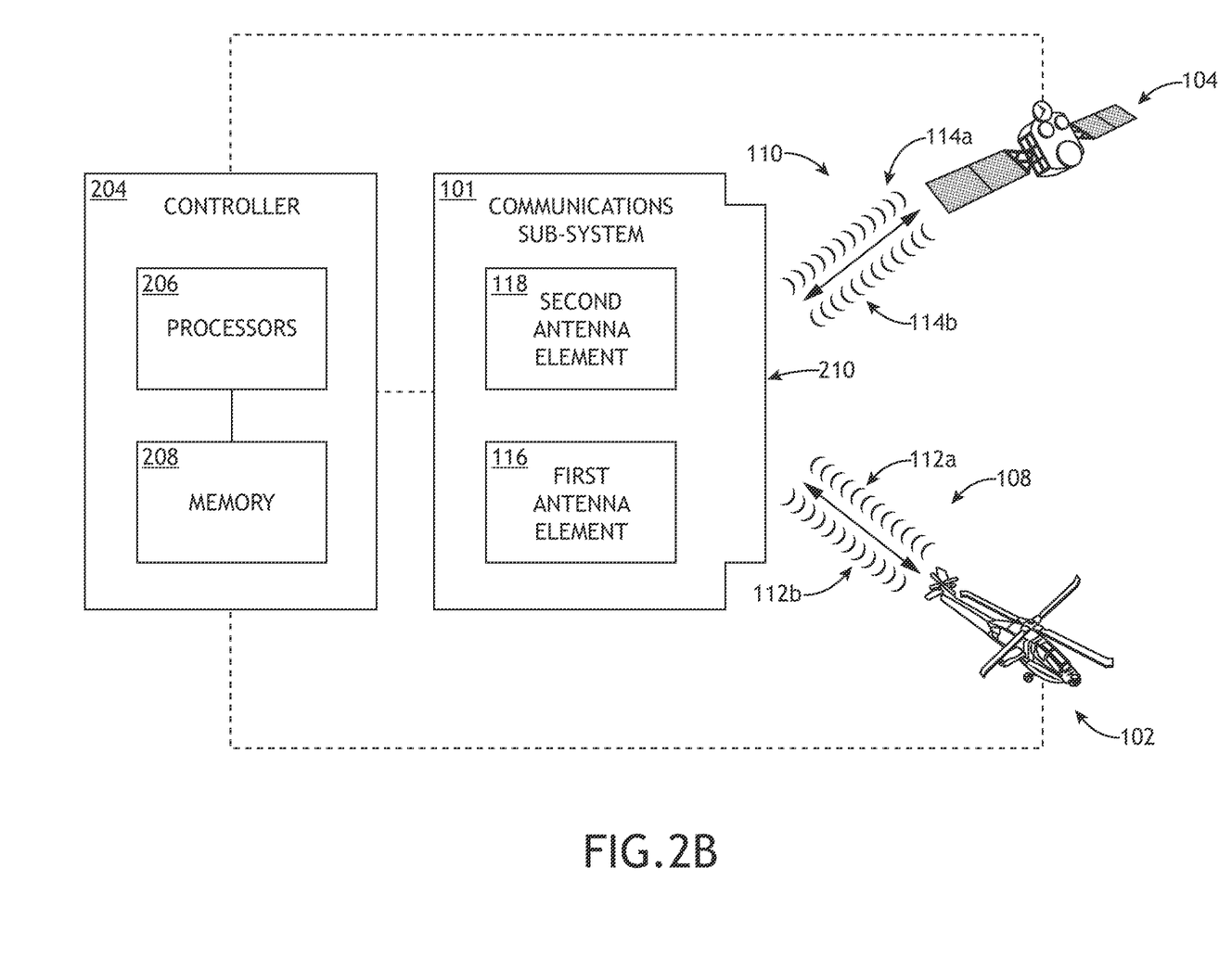
FIG. 2B is a conceptual illustration of an exemplary embodiment of a communications system, in accordance with one or more embodiments of the present disclosure.

FIG. 2B is a conceptual illustration of an exemplary embodiment of a communications system, in accordance with one or more embodiments of the present disclosure. As previously described, the system 100 may include common aperture 210 configured to permit the transmission and receipt of one or more radio frequency signals (e.g., the one or more first radio frequency signals 112 and/or the one or more second radio frequency signals 114) to and/or from the plurality of communications sub-systems 101 to one or more other components of the system 100 (e.g., the one or more operators 102 and/or the one or more low-earth satellites 104). It is specifically contemplated that the common aperture 210 may be configured for the simultaneous transmission of the one or more first radio frequency signals 112 and the one or more second radio frequency signals 114. As previously described, the common aperture 210 may be communicatively and/or mechanically coupled to the plurality of communications sub-systems 101, and may include any antenna aperture known in the art to be suitable for the purposes contemplated by the present disclosure, including, without limitation, pyramidal apertures, conical apertures, rectangular apertures, waveguides, parabolic reflectors, screens, phased arrays, omnidirectional apertures, monopole-based apertures, dipole-based apertures, helical apertures, or the like.

It is specifically contemplated that the inventive concepts of the present disclosure may be implemented in one or more embodiments for use in military, civilian, commercial, and other communications settings. For example, it is specifically contemplated that the inventive concepts of the present disclosure may be implemented in military aviation settings. By way of another example, the inventive concepts of the present disclosure may be implemented in civilian aviation settings (e.g., continuous internet and/or network connectivity in overland flight using LOS communications and in overwater flight using BLOS communications). By way of another example, the inventive concepts of the present disclosure may be implemented in non-aviation settings where simultaneous and/or continuous LOS and BLOS communications are desirable (e.g., remote oil exploration or the like).

Figure 3:
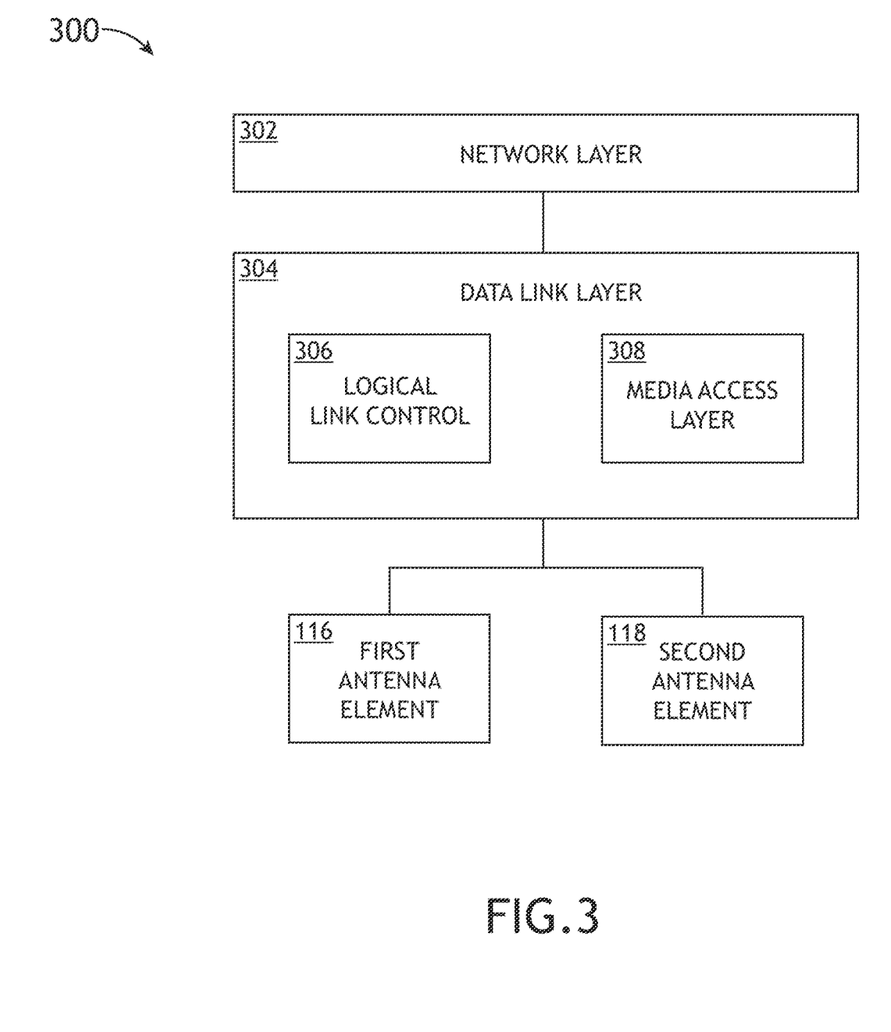
FIG. 3 is a conceptual illustration of an exemplary embodiment of a system for line-of-sight and beyond-line-of-sight communications using a single aperture, in accordance with one or more embodiments of the present disclosure.

Referring to FIG. 3, a conceptual illustration of an exemplary embodiment of a system for line-of-sight and beyond-line-of-sight communications using a single aperture is illustrated, in accordance with one or more embodiments of the present disclosure. The system 100 may be configured with a system architecture 300 configured to allow for coordination between a network (e.g., represented by network layer 302) and a data link layer 304 of the system 100. For example, a physical layer of the system architecture 300 may include the first antenna element 116 and the second antenna element 116, and the data link layer 304 (e.g., including a logical link control 306 and a media access layer 308) may be configured such that each of the first antenna element 116 and the second antenna element 116 may be communicatively coupled to and/or controlled (e.g., through one or more network topology control processes) by the network simultaneously. It is contemplated that the system architecture 300 may be configured using any method known in the art to be suitable for performing and/or carrying out the processes and inventive concepts contemplated by the present disclosure.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A communications sub-system, the communications sub-system comprising:
   a phased array comprising:
      a first antenna element configured to transmit and receive, in a first operating mode, one or more first radio frequency signals along a first directional link, wherein the first directional link comprises a line-of-sight link, wherein the one or more first radio frequency signals comprise electromagnetic waves in a V-band and having a frequency between 40 gigahertz and 75 gigahertz; and
      a second antenna element configured to transmit and receive, in a second operating mode, one or more second radio frequency signals along a second directional link, wherein the second directional link comprises a beyond-line-of-sight link with one or more low-earth orbit satellites, wherein the one or more second radio frequency signals comprise electromagnetic waves in a Ka-band and having a frequency between 26 gigahertz and 40 gigahertz; and
   one or more controllers having one or more processors, wherein the one or more processors are configured to execute a set of written program instructions stored in one or more memory units, wherein the set of written program instructions is configured to cause the controller to provide one or more control signals to at least one of the first antenna element or the second antenna element;
   wherein the communications sub-system is communicatively coupled to the one or more low-earth orbit satellites via the second antenna element, and wherein the communications sub-system is configured to transmit to and receive from the one or more low-earth orbit satellites the one or more second radio frequency signals along the second directional link;
   wherein prior to transmission of the one or more first radio frequency signals, the communications sub-system performs one or more conversion functions to extract data transmitted from the one or more low-earth orbit satellites via the one or more second radio frequency signals along the second directional link, wherein the data is transmitted via the one or more first radio frequency signals along the first directional link;
   wherein the communications sub-system includes a system architecture comprising a physical layer, a data link layer, and a network layer; wherein the physical layer includes the first antenna element and the second antenna element;
   wherein the data link layer is configured such that each of the first antenna element and the second antenna element are controlled by the network layer simultaneously.

2. The communications sub-system of claim 1, wherein each of the first operating mode and the second operating mode comprises at least one of a time-phased mode, a nearly-simultaneous time-division multiple access (TDMA) mode, or a simultaneous mode.

3. The communications sub-system of claim 2, the first operating mode is different from the second operating mode.

4. The communications sub-system of claim 2, wherein the first antenna element is configured to transmit and receive the one or more first radio frequency signals along the first directional link and the second antenna element is configured to transmit and receive the one or more second radio frequency signals along the second directional link simultaneously via the phased array.

5. The communications sub-system of claim 4, wherein the communications sub-system is communicatively coupled to one or more other communications sub-systems via the first antenna element, and wherein the communications sub-system is configured to transmit to and receive from the one or more other communications sub-systems the one or more first radio frequency signals along the first directional link.

6. The communications sub-system of claim 5, wherein the communications sub-system is disposed on of at least one of a manned aerial vehicle, an unmanned aerial vehicle, a ground-based vehicle, a ground-based station, or a ground-based person.

7. A communications system, comprising:
   a plurality of operators positioned in an environment, the plurality of operators comprising a first operator and a second operator;
   one or more low-earth orbit satellites;
   a plurality of communications sub-systems, the plurality of communications sub-systems comprising a first communications sub-system disposed on the first operator and a second communications sub-system disposed on the second operator, wherein each of the plurality of communications sub-systems is configured to operate in an operating mode, and wherein each of the plurality of communications sub-systems comprises at least:
      a phased array comprising:
         a first antenna element configured to transmit to and receive from at least one of the plurality of communications sub-systems one or more first radio frequency signals along a first directional link, wherein the first directional link comprises a line-of-sight link, wherein the one or more first radio frequency signals comprise electromagnetic waves in a V-band and having a frequency between 40 gigahertz and 75 gigahertz; and
         a second antenna element configured to transmit to and receive from the one or more low-earth orbit satellites one or more second radio frequency signals along a second directional link, wherein the second directional link comprises a beyond-line-of-sight link with the one or more low-earth orbit satellites, wherein the one or more second radio frequency signals comprise electromagnetic waves in a Ka-band and having a frequency between 26 gigahertz and 40 gigahertz; and
      one or more controllers having one or more processors, wherein the one or more processors are configured to execute a set of written program instructions stored in one or more memory units, wherein the set of written program instructions is configured to cause the controller to provide one or more control signals to at least one of the first antenna element or the second antenna element;

wherein each of the plurality of communications sub-systems are communicatively coupled to the one or more low-earth orbit satellites via the second antenna element, and wherein each of the plurality of communications sub-system are configured to transmit to and receive from the one or more low-earth orbit satellites the one or more second radio frequency signals along the second directional link;

wherein prior to transmission of the one or more first radio frequency signals, each of the plurality of communications sub-systems performs one or more conversion functions to extract data transmitted from the low-earth orbit satellites via the one or more second radio frequency signals along the second directional link, wherein the data is transmitted via the one or more first radio frequency signals along the first directional link;

wherein the plurality of communications sub-systems include a system architecture comprising a physical layer, a data link layer, and a network layer;

wherein the physical layer includes the first antenna element and the second antenna element; wherein the data link layer is configured such that each of the first antenna element and the second antenna element are controlled by the network layer simultaneously.

8. The communications system of claim 7, wherein the first antenna element is configured to transmit and receive the one or more first radio frequency signals along the first directional link and the second antenna element is configured to transmit and receive the one or more second radio frequency signals along the second directional link simultaneously via the common aperture.

9. The communications system of claim 8, wherein the plurality of operators comprise at least one of a manned aerial vehicle, an unmanned aerial vehicle, a ground-based vehicle, a ground-based station, or a ground-based person.

* * * * *